Nov. 2, 1954          R. T. HALL          2,693,251
          TOW VEHICLE AND TRAILER BRAKE SYSTEM
Filed Jan. 29, 1951                    3 Sheets-Sheet 1
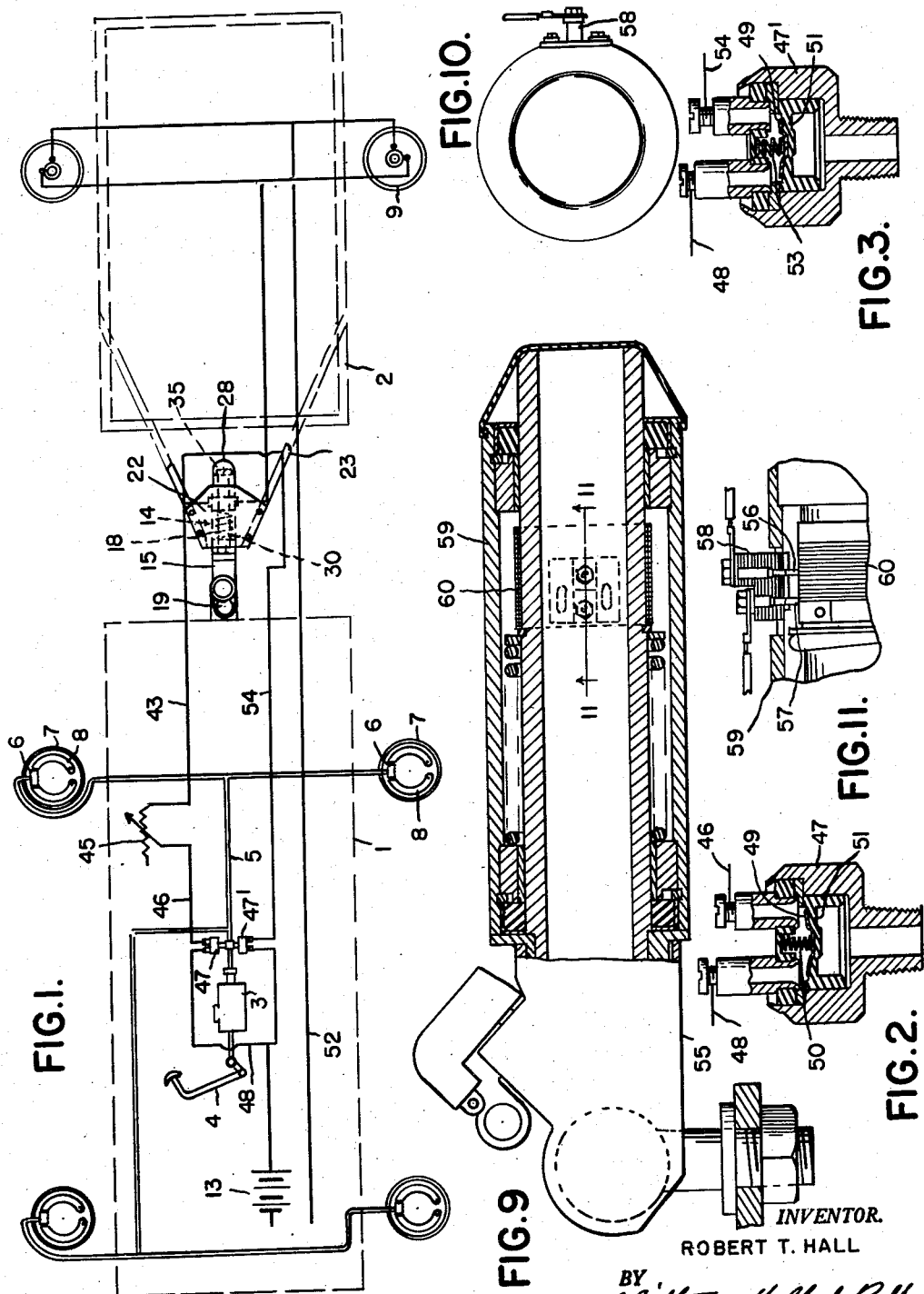
INVENTOR.
ROBERT T. HALL
BY
ATTORNEYS

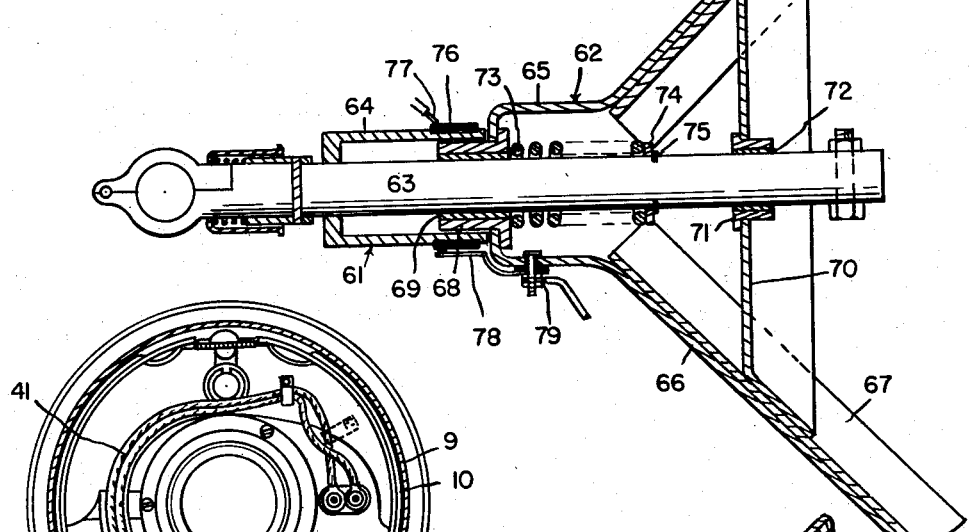
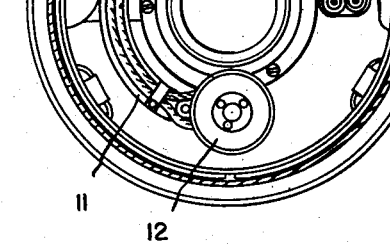
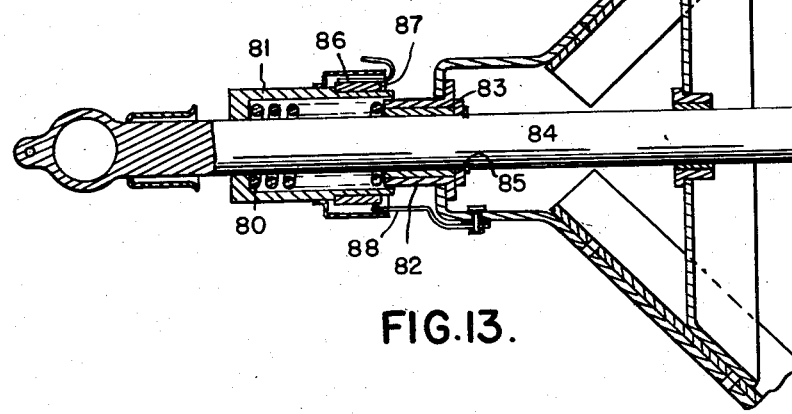

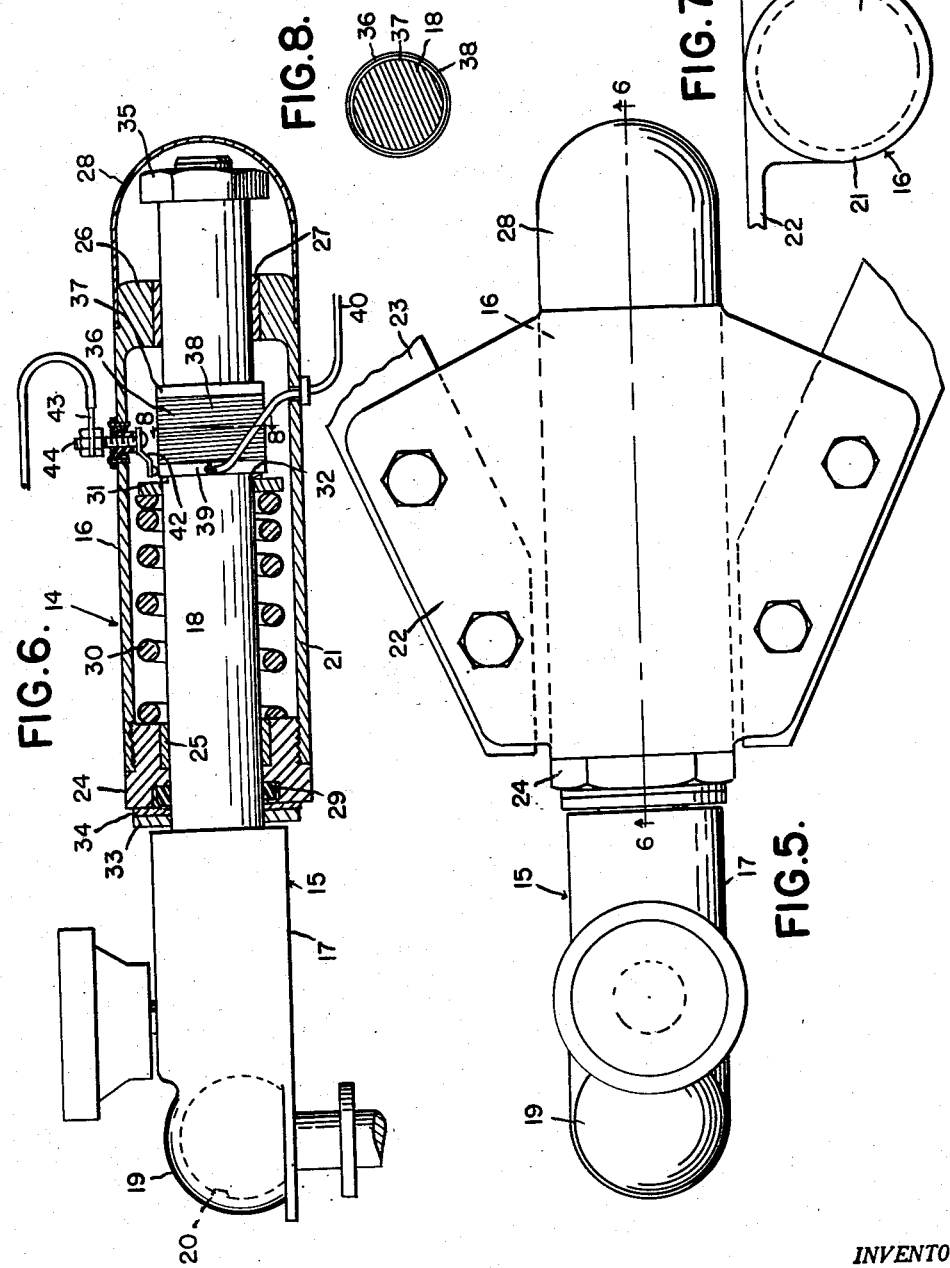

United States Patent Office 2,693,251
Patented Nov. 2, 1954

2,693,251

TOW VEHICLE AND TRAILER BRAKE SYSTEM

Robert T. Hall, Birmingham, Mich., assignor to Kelsey-Hayes Wheel Company, Detroit, Mich., a corporation of Delaware Application January 29, 1951, Serial No. 208,397

7 Claims. (Cl. 188—3)

The invention relates to tow vehicle and trailer brake systems and refers more particularly to systems in which the tow vehicle is equipped with a manually operable master cylinder for operating the tow vehicle brakes and the trailer is equipped with electrically energizable means for operating the trailer brakes.

The invention has for one of its objects to provide an improved tow vehicle and trailer brake system in which the trailer brakes are applied prior to or at the time of but not later than the application of the tow vehicle brakes to prevent jackknifing.

The invention has for other objects to provide an improved hitch for coupling the trailer to the tow vehicle, the hitch having means for controlling the degree of application of the trailer brakes to thereby control their effectiveness; to provide an improved hitch comprising relatively movable members connected to the tow vehicle and trailer, means for normally maintaining these members in predetermined relation, a resistance carried by one of the members and a contact movable over the resistance in accordance with the relative movement of the hitch members for controlling the effectiveness of the trailer brakes; to provide switch means operable by pressure developed by the master cylinder for making the electric circuit through the contact engaging the resistance; and to provide a plurality of such switch means operable at different pressures to control the strength of the electric current flowing through the electric circuit.

With these as well as other objects in view, the invention resides in the novel features of construction and combinations and arrangements of parts as more fully hereinafter set forth.

In the drawing:

Figure 1 is a diagrammatic view illustrating a tow vehicle and trailer brake system embodying the invention;

Figures 2, 3 and 4 are details;

Figure 5 is a plan view of the hitch employed for coupling the trailer and tow vehicle;

Figure 6 is a side elevation partly in section on the line 6—6 of Figure 5;

Fig. 7 is an end view;

Figure 8 is a cross section on the line 8—8 of Figure 6;

Figure 9 is a view similar to Figure 6 showing a modified construction;

Figure 10 is an end view;

Figure 11 is a cross section on the line 11—11 of Figure 9;

Figure 12 is a horizontal section through a modified construction of hitch; and

Figure 13 is a similar view showing another modified hitch construction.

As illustrated in Figure 1, 1 is the tow vehicle and 2 is the trailer. The tow vehicle which may be a passenger motor vehicle is equipped with the conventional master cylinder 3 which is operable by the foot pedal 4 and is connected by the hydraulic line 5 to the wheel cylinders 6 for applying the tow vehicle brakes. These brakes are of conventional construction and, as shown, have the brake drums 7 rotatable with the tow vehicle wheels and the brake shoes 8 which are adapted to be forced against the brake drum by the wheel cylinders. The trailer which may be a house trailer is equipped with electric brakes which are also of conventional construction and, as shown in Figure 4, have the brake drums 9 rotatable with the trailer wheels and the brake bands 10 which are adapted to be forced against the brake drums by the pivotal levers 11 carrying the electromagnets 12 which upon being electrically energized contact plates fixedly secured to and rotatable with the webs of the brake drums. The source of electric energy is the battery 13 of the tow vehicle.

For coupling the trailer and tow vehicles to each other there is the hitch 14 which, as shown particularly in Figures 5 to 8 inclusive, comprises the relatively movable members 15 and 16 connected respectively to the tow vehicle and the trailer. The hitch member 15 is formed of the body 17 and the shaft 18 threaded into the rear end of the body. The body has at its front end the socket 19 for detachably receiving the ball 20 which is secured to the tow vehicle. Suitable mechanism (not shown) of conventional construction is provided for locking the ball within the socket. The hitch member 16 is formed with the tubular portion 21 and the side wings 22 which latter are secured to the forward extensions 23 of the trailer frame. The tubular portion encircles the shaft 18 and has threaded into its front end the nut 24 which is provided with the bearing 25 for the shaft 18. The rear end of the tubular portion has the transverse wall 26 which is provided with the bearing 27 for the shaft. For enclosing the rear end of the shaft, there is the sheet metal cup 28 secured to the rear end of the tubular portion 21. 29 is a suitable seal between the nut and the shaft. For normally maintaining the hitch members in a predetermined relative position there is the coil spring 30 encircling the shaft and located within the tubular portion and abutting the nut 24 and the washer 31 which latter is held from rearward movement on the shaft by means of the spring clip 32 extending into an annular slot in the shaft. To limit the relative movement of the hitch members, the washers 33 and 34 are provided encircling the shaft 18 and located between the body 17 and the nut 24 and also the nut 35 is provided on the rear end of the shaft 18 for abutting the transverse wall 26.

36 is a wound resistance fixedly secured to the shaft 18 and abutting the rear side of the spring clip 32, this resistance being formed of the insulator sleeve 37 fixedly secured to the shaft by suitable means such as cement and the resistance winding 38 on the sleeve and connected at its front end to the annular electrical conductor 39 which is also mounted on and secured to the sleeve. 40 is an electrical conducting wire fixed to the annular electrical conductor 39 and extending through the tubular portion 21 of the hitch member 16 to one of the electrical conducting wires 41 of each electric brake leading to the electromagnet 12. 42 is a spring contact engaging the wound resistance and secured to and insulated from the tubular portion 21 of the hitch member 16 and 43 is an electrical conducting wire connected at one end to the terminal post 44 for the contact 42 and at the other end to a terminal of the manually operable variable resistance device 45 of conventional construction. The other terminal of the device is connected by the electrical conducting wire 46 to a terminal of the switch 47 shown particularly in Figure 2 which is operable by the pressure developed by the master cylinder 3 upon depression of the foot pedal 4. The switch illustrated in the present instance is of that type shown in the J. W. White Patent 1,918,880 issued July 18, 1933 and in addition to the above terminal has a second terminal which is connected by the electrical conducting wire 48 to a terminal of the battery 13 of the tow vehicle. The pressure chamber of the switch is in communication with the hydraulic line 5 and the making of the electric circuit by the movable contact 49 bridging across the terminals of the switch is controlled by the coil spring 50 which bears upon the movable contact which in turn rests against the flexible diaphragm 51 forming one end of the pressure chamber. The spring has a strength such that it yields to permit the movable contact to bridge across the terminals of the switch slightly prior to or substantially at the time the pressure in the hydraulic line is sufficient to take up the clearance between the brake shoes and the drums of the tow vehicle brakes but before effective braking action of these brakes takes place. As a result the electric circuit through the wire 48, switch 47, wire 46, manually operable variable resistance device 45, wire 43 and wound resistance 36, wiring including wire 40 and wires 41, electromagnets 12 and the return wire 52 from one of the wires 41 of each electromagnet to the other terminal of the battery 13 is completed so that the electric brakes of the trailer are applied prior to effective application of the tow vehicle brakes. As shown in the present instance, the contact 42 in the normal relative position of the hitch members 15 and 16 engages the same zone of the wound resistance as that to which the wire 40 is secured so that the maximum strength of electric current as controlled by the manually operable variable resistance 45 flows through the electromagnets 12. As a consequence the movement of the trailer is retarded with respect to the tow vehicle and the hitch member 16 moves rearwardly with respect to the hitch member 15 against the force exerted by the coil spring 30. It is apparent that the greater the relative movement the greater the resistance to flow of electric current and the less its strength or amperage for attracting the electromagnets 12 to the plates rotating with the brake drums. When the strength of the current is too little so that the trailer moves forward relative to the tow vehicle the spring 30 acts to relatively move the hitch members in the reverse direction thereby cutting down the resistance to the electric current and providing for a greater strength of electric current for applying the trailer brakes.

For the purpose of cutting out the variable resistance offered by the manually operable variable resistance device 45, I have provided the second switch 47' (shown in Fig. 3) operable by the pressure developed by the master cylinder 3 upon depression of the foot pedal 4. This second switch is constructed in the same manner as the switch 47 with the exception that its coil spring 53 is stronger than the coil spring 50 and requires a substantially higher pressure in the hydraulic line 5 before the terminals of the second switch can be bridged. In the present instance, the strength of the coil spring 50 is such that a pressure of approximately fifty pounds per square inch in the hydraulic line 5 is required before the terminals of the switch 47 can be bridged while the strength of the coil spring 53 is such that a pressure in the hydraulic line 5 of approximately one hundred pounds per square inch is required before the terminals of the second switch can be bridged. One terminal of the second switch is electrically connected to the same terminal of the battery 13 as a terminal of the switch 47 by wiring including the wire 48 while the other terminal of the second switch is electrically connected by the electrical conducting wire 54 to either the terminal post 44 or a terminal post corresponding to the terminal post 44 for a second movable contact corresponding to the movable contact 42 and located beside the same and engaging the same zone of the resistance 36.

It is apparent that when sufficient pressure is developed in the hydraulic line 5, the terminals of the second switch are bridged so that electric current may then flow from the battery to the movable contact independently of the manually operable variable resistance device. As a result, a materially increased strength of electric current may flow through the electromagnets of the trailer brakes. Thus, as the effectiveness of the tow vehicle brakes is increased so is the effectiveness of the trailer brakes increased, the degree of effectiveness of the trailer brakes being varied through the resistance 36 in the same manner as above described when the circuit through the first switch 47 only is closed.

The construction illustrated in Figures 9, 10 and 11 is quite similar to that illustrated in Figures 1 to 8 inclusive with the exception that the front hitch member 55 is formed to be equipped with a different conventional mechanism for locking the ball to the socket and also with the exception that the two movable contacts 56 and 57 controlled respectively by low and high pressure switches corresponding to the switches 47 and 47' respectively are mounted on the same insulator block 58. The block is secured to the tubular portion 59 of the rear hitch member and the contacts are spring pressed into engagement with different zones of the wound resistance 60. In this case, manually operable variable resistance between the battery and the movable contact 58 is omitted inasmuch as in the normal relative position of the hitch members, there is always a resistance to the flow of electric current through the movable contact 58 to the electromagnets of the trailer brakes by the wound resistance 60.

As shown in Figure 12, 61 and 62 are the front and rear hitch members, the front hitch member having the shaft 63 and the tubular member 64 fixedly secured to the shaft. The rear hitch member has the tubular portion 65 and the arms 66, the latter being secured to the extension 67 of the trailer frame. The tubular portion has at its front end the bushing 68 which telescopes within the tubular member 64. 69 is a bearing within the bushing 68 for the shaft 63. The trailer frame extensions 67 have secured thereto the cross bar 70 to which is secured the bushing 71 within which is located the bearing 72 for the shaft 63. 73 is a coil spring encircling the shaft and abutting the bushing 68 and the collar 74 which is held in place on the shaft by the spring clip 75 engaging an annular groove in the shaft. The wound resistance 76 is mounted on and secured to the tubular member 64 and the electrical conducting wire 77 which is fixed with respect to the wound resistance leads forwardly to the tow vehicle while the contact 78 movable over the wound resistance is connected to the electrical conducting wire 79 leading rearwardly to the electric brakes.

The construction shown in Figure 13 is quite similar to that of Figure 12 but differs in the location of the coil spring between the hitch members and also in the relative location of the wire and movable contact for keeping the electric circuit through the wound resistance. In detail, the coil spring 80 abuts the bottom of the tubular member 81 of the front hitch member and the bushing 82 of the rear hitch member and normally holds the bushing against the collar 83 which is secured in place on the shaft 84 of the front hitch member by the spring clip 85 engaging an annular groove in the shaft. The electrical conducting wire 86 is connected to the wound end of the wound resistance 87 in the same manner as the wire 77 is connected to the wound resistance 76 of Figure 12. However, the movable contact 88 instead of engaging the wound resistance in the same zone as the point of connection of the wire 86 to the wound resistance engages the rear end of the wound resistance in the normal position of the hitch members. As a result of this relative location it will be seen that when the electric circuit is completed the wound resistance initially offers the maximum ohmic resistance to the flow of the electric current to the electric brakes and that as the trailer moves forwardly relative to the tow vehicle the ohmic resistance decreases so that more electric current flows to the electric brakes to more effectively apply the same. If desired, the movable contacts of the above described constructions may all be correspondingly located to secure the same operation as that secured by the construction of Figure 10.

What I claim as my invention is:

1. In a tow vehicle and trailer brake system including a tow vehicle brake and a trailer brake, a manually operable master cylinder for operating the tow vehicle brake, electrically energizable means for operating the trailer brake, a hitch between the tow vehicle and the trailer comprising a member connected to the tow vehicle, a second member connected to the trailer and movable relative to said first mentioned member and a spring for normally maintaining said members in a predetermined relative position, a resistance carried by one of said members, a contact movable over said resistance in accordance with relative movement of said hitch members, wiring electrically connecting said resistance to said electrically energizable means, and switch means operable by pressure developed by said master cylinder for electrically connecting said contact to a source of electric energy.

2. In a tow vehicle and trailer brake system including a tow vehicle brake and a trailer brake, a manually operable master cylinder for operating the tow vehicle brake, electrically energizable means for operating the trailer brake, a hitch between the tow vehicle and the trailer comprising a member connected to the tow vehicle, a second member connected to the trailer and movable relative to the first mentioned member and a spring for normally maintaining said members in a predetermined relative position, a resistance, wiring electrically connecting said resistance to said electrically energizable means, a contact engaging said resistance, the connection of said wiring to said resistance and said contact being movable relative to each other in accordance with relative movement of said hitch members, and switch means operable by pressure developed by said master cylinder for electrically connecting said contact to a source of electric energy.

3. In a tow vehicle and trailer brake system including a tow vehicle brake and a trailer brake, a hydraulic actuator for aplying the tow vehicle brake, a manually operable master cylinder, a hydraulic line leading from said master cylinder to said hydraulic actuator, an electrically energizable member for applying the trailer brake, a hitch between the tow vehicle and the trailer comprising relatively movable members connected to the tow vehicle and the trailer and a spring for normally maintaining said hitch members in a predetermined relative position, a resistance movable with one of said hitch members, wiring for electrically connecting said resistance to said electrically energizable member, contact means movable over said resistance in accordance with the relative movement of said hitch members, a second resistance, means including a switch communicating with said hydraulic line and operable by pressure developed by said master cylinder for electrically connecting said contact means to a source of electric energy through said second mentioned resistance and other means including a second switch communicating with said hydraulic line and operable by a greater pressure developed by said master cylinder for electrically connecting said contact means to a source of electric energy independently of said second mentioned resistance.

4. In a tow vehicle and trailer brake system including a tow vehicle brake and a trailer brake, a manually operable master cylinder for operating the tow vehicle brake, an electrically energizable member for applying the trailer brake, a hitch between the tow vehicle and the trailer comprising relative movable members connected to the tow vehicle and the trailer and a spring for normally maintaining said hitch members in a predetermined relative position, a resistance carried by and movable with one of said hitch members, wiring for electrically connecting said resistance to said electrically energizable member, contact means movable over said resistance in accordance with the relative movement of said hitch members, a manually adjustable variable resistance, means including a switch operable by pressure developed by said master cylinder for electrically connecting said contact means to a source of electric energy through said second mentioned resistance, and other means including a second switch operable by a greater pressure developed by said master cylinder for electrically connecting said contact means to a source of electric energy independently of said second mentioned resistance.

5. In a tow vehicle and trailer brake system including a tow vehicle brake and a trailer brake, a manually operable master cylinder for operating the tow vehicle brake, electrically energizable means for operating the trailer brake, a hitch between the tow vehicle and the trailer comprising a member connected to the tow vehicle, a second member connected to the trailer and movable relative to the first-mentioned member and a spring for normally maintaining said members in a predetermined relative position, a resistance, wiring electrically connecting said resistance to said electrically energizable means, a contact engaging said resistance, the connection of said wiring to said resistance and said contact being movable relative to each other in accordance with relative movement of said hitch members, switch means operable by pressure developed by said master cylinder for electrically connecting said contact to a source of electric energy, a second contact engaging said resistance in a zone spaced from the zone of engagement therewith of said first-mentioned contact and toward said connection, said connection and said second contact being movable relative to each other in accordance with relative movement of said hitch members, and additional switch means operable by a greater pressure developed by said master cylinder for electrically connecting said second contact to a source of electric energy.

6. In a tow vehicle and trailer brake system including a tow vehicle brake and a trailer brake, a manually operable device for operating the tow vehicle brake, electrically energizable means for operating the trailer brake, a hitch between the tow vehicle and the trailer comprising a member connected to the tow vehicle and a second member connected to the trailer and movable relative to the first-mentioned member, a resistance, wiring electrically connecting said resistance to said electrically energizable means, a contact engaging said resistance, the connection of said wiring to said resistance and said contact being movable relative to each other in accordance with relative movement of said hitch members, switch means operable by said manually operable device for electrically connecting said contact to a source of electric energy, a second contact engaging said resistance in a zone spaced from the zone of engagement therewith of said first-mentioned contact and toward said connection, said connection and said second contact being movable relative ot each other in accordance with relative movement of said hitch members, and additional switch means operable by said manually operable device for electrically connecting said second contact to a source of electric energy, said first-mentioned switch means being operable upon initial operation of said manually operable device and said additional switch means being operable upon further operation of said manually operable device sufficient to obtain increased braking action of the tow vehicle brake.

7. The structure as defined in claim 6, having means for normally maintaining said hitch members in a predetermined relative position.

References Cited in the file of this patent

UNITED STATES PATENTS

| Number | Name | Date |
|---|---|---|
| 2,144,401 | Buckellew | Jan. 17, 1939 |
| 2,258,876 | Banning, Jr. | Oct. 14, 1941 |
| 2,452,033 | Born | Oct. 26, 1948 |
| 2,454,291 | Penrose | Nov. 23, 1948 |

FOREIGN PATENTS

| Number | Country | Date |
|---|---|---|
| 439,728 | Germany | Jan. 17, 1927 |
| 583,214 | Germany | Aug. 30, 1933 |